United States Patent

Wakaoka et al.

[11] Patent Number: 5,880,847
[45] Date of Patent: Mar. 9, 1999

[54] MEASURING METHOD OF SPHERICITY OF BALL END MILL

[75] Inventors: Shunske Wakaoka, Konan; Takao Hasebe, Kasugai, both of Japan

[73] Assignee: Okuma Corporation, Nagoya, Japan

[21] Appl. No.: 965,997

[22] Filed: Nov. 7, 1997

[30] Foreign Application Priority Data

Nov. 11, 1996 [JP] Japan .................................. 8-315627

[51] Int. Cl.⁶ .................................................. G01B 11/24
[52] U.S. Cl. ............................................................. 356/376
[58] Field of Search ........................ 356/376; 364/474.17

[56] References Cited

U.S. PATENT DOCUMENTS

| 4,807,145 | 2/1989 | Takahashi et al. | 364/474.17 |
| 4,908,951 | 3/1990 | Gurny | 356/376 |

FOREIGN PATENT DOCUMENTS

| A-2-311242 | 12/1990 | Japan . |
| 4-66286-B2 | 10/1992 | Japan . |
| 7-4995-B2 | 5/1995 | Japan . |

*Primary Examiner*—Frank G. Font
*Assistant Examiner*—Zandra V. Smith
*Attorney, Agent, or Firm*—Oliff & Berridge PLC

[57] ABSTRACT

A method of automatically measuring sphericity of a ball end mill on a machining device under nearly identical conditions to those at the time of machining. Under a cross rail 1 of the machining device, a laser measuring device (6) is placed through a mount (7) so that a laser optical axis "a" is in the X-axis direction. A ball end mill T is fixed through a milling chuck (5) to a main spindle (4) carried rotatably by a main spindle ram (3) that can be positioned along the Z-axis direction of a main spindle head 2, which can itself be positioned in the Y-axis direction. While rotating, the tip of ball end mill T is set using laser beams. A position shifted by one radius of a tool from the tip is set as the ball center. One radius of a cutting face is measured by sliding the ball end mill on the nominal of the ball per an arbitrary angle within 90°. The sphericity of the ball end mill T is obtained from the respective one radius at each angle.

6 Claims, 9 Drawing Sheets

MEASURING METHOD OF SPHERICITY OF BALL END MILL

BACKGROUND OF THE INVENTION

1. Field of the Invention

The present invention relates to a method of measuring the roundness of a ball end mill.

2. Description of the Background Art

In metal mold machining, the formation of free curved surfaces is normally performed by machining methods utilizing ball end mills because, when machining a curved surface, a cutting point is present on the normal to a machined surface, and ordinary angle end mills therefore, can not machine along such a shape.

In finish machining, it is especially necessary to form a desired curved surface, which requires high precision ball end mills.

As shown in FIG. 11(*a*), when a dish-shaped circular arc of a work W is cut by a ball end mill T whose cutting edge shape is far from a sphere, it is impossible to finish a machined surface into a desired shape. A result is shown in FIG. 11(*b*).

In general, the sphericity of ball end mills depends on precision at the time of purchase. In actual machining, it is difficult to obtain precise roundness because precision is lowered due such ordinary factors as the tool holders deflection and main spindle, the wearing-out of cutting edges, and the like.

Tool manufacturers often use visual means to confirm precision while rotating a tool by using a tool microscope with a projector. As a result, visual observation measuring error is added to error from cutting edge grinding and from removal for measurement. The guarantee precision for general tools is about 0.1 mm, while that for high precision tools is about 0.03 mm. It is therefore evident that the total error when these tools are used for machining makes it impossible to achieve the required precision.

Normally, in machining employing ball end mills, the diameter of tools is altered depending on machining shape in a range from about 50 mm to about 3 mm in terms of machining efficiency and tool rigidity. In finish machining, the previous tool leaves a machining line, causing a partial concave-shape.

As described above, in high precision machining employing ball end mills, precise sphericity is an essential property desired in balls (cutting faces). Devices for tool inspection that measure the sphericity of cutting edges have recently been developed. As shown in FIG. 12, Japanese Patent Publication No. Hei. 7-49955 (1995) discloses a device for tool inspection comprising a work head 101 that horizontally fixes a base of a ball end mill T and carries it rotatably and a measuring probe 102 that measures the shape of a cutting part of the ball end mill. The measuring probe 102 is pivotable horizontally in the center of a pivot 103 on the horizontal and also can advance or retreat to the pivot 103 on the horizontal. The ball end mill T carried by the work head 101 is rotatable around the X-axis crossing at a right angle with the pivot 103.

The above publication also discloses a measuring method of ball end mills utilizing the aforesaid device for tool inspection. In this method, in the process of preparation the measuring probe 102 is allowed to come into contact with the tip of the ball end mill T to calculate the distance from the center of the pivot 103 to the tip of the cutting edge. The rotated angular position of the measuring probe 102 and the horizontal plane are calculated. Thereafter, the measuring probe 102 is turned to a position where it crosses at a right angle to the X-axis on the horizontal, thereby measuring the diameter of a ball to obtain its radius. Based on the results, the ball end mill is positioned by moving along X-axis direction so that the pivot is located one radius away from the tip of the ball end mill T. The distance from the ball end mill T to the tip of the measuring probe 102 is then measured.

Both the microscope for tool inspection in the prior art and the device for tool inspection disclosed in the above publication, however, introduce error due to attachment for inspection and thus fail to obtain the actual value of roundness precision. For tools users, roundness as measured when fixed to a main spindle is of importance and it is a serious defect that the ultimate roundness, obtained by adding the deflections of a main spindle and a tool holder to the precision of a tool itself, cannot be measured.

SUMMARY OF THE INVENTION

To overcome the foregoing problem, in one aspect, the present invention is method of measuring the sphericity of a ball end mill and comprises steps of: fixing a reference tool of known precise outer diameter to a main spindle of a machining device and, while rotating the main spindle, relatively moving a laser measuring device and the reference device to measure a position of a periphery of the reference tool when laser beams cross the periphery; obtaining a rotational center of the reference tool from the position of the periphery; fixing a ball end mill in place of the reference tool to the main spindle and, while rotating the main spindle, measuring a position of a tip of the ball end mill in the rotational center by the laser measuring device; obtaining a ball center of the ball end mill from the position of the tip; assuming a plurality of measuring lines crossing a peripheral cutting face of the ball end mill by using the ball center; relatively moving the ball end mill and the laser measuring device on the measuring lines while rotating the main spindle, to measure a position of the cutting face when laser beams cross the peripheral cutting face of the ball end mill; obtaining an actual radius from the position of the cutting face to the ball center; and then obtaining a sphericity of the cutting face from a difference between the actual radius and the nominal radius.

A measuring method of the present invention may further include: relatively moving the laser measuring device and the ball end mill to measure two points on both side surfaces via a rotational center of the ball end mill; obtaining a position of the rotational center from a distance between the measured two points; measuring a position of a tip of the ball end mill on the rotational center; obtaining a ball center from the measured position of the tip; measuring a plurality of arbitrary points on the cutting face by laser beams; obtaining each actual radius on a normal from each point of the cutting face to the ball center; and obtaining a sphericity of the cutting face based on differences between the actual radiuses and the nominal radiuses.

Further, according to the present invention, measurements of the arbitrary points on a cutting face may be conducted by relatively moving the laser measuring device and the ball end mill along a nominal on the cutting face.

Further, according to the present invention, each actual radius on the normal of the ball end mill may be overlaid with each nominal radius on a screen display, such as CRT displays.

Moreover, the present invention may further include setting a relative displacement of the ball end mill and the laser measuring device per one rotation of the ball end mill, depending on measuring precision.

Further, according to the present invention, the laser measuring device may output signals when the ball end mill intercepts a laser beam or a laser beam resumes passing.

In accordance with the measuring method of ball end mill sphericity, sphericity is measured in a state where a ball end mill is fixed to a main spindle of a machining device and rotated, that is, a state similar to machining. Therefore, measurement can be carried out immediately after tool replacement or immediately before finish machining, making it possible to selectively use only ball end mills within an allowable value of sphericity. This enables the finishing of a machined surface to a shape close to an ideal one, and eliminates any need for hand correction of machined surfaces after machining.

Further, in accordance with the present invention, a laser measuring device that outputs sensor signals when laser beams are interrupted or resume passing is disposed in places where it does not interfere with routine tasks, for example, in a corner of a table of a machining device or at the end of a cross rail. The laser measuring device side or a ball end mill side is moved by an NC slide in the normal of a ball to measure the actual radius by the sensor signals of the laser measuring device. Sphericity measurement can also be incorporated into a machining program for automation, thus enabling unmanned measurement.

Further, in accordance with the present invention, the actual radius is overlaid with a nominal radius for each measured angle on a CRT display, enabling understanding of the tendency of error on a CRT screen display; and making it easy to determine whether a ball end mill beyond an allowed value can still be used for rough machining.

Further, in accordance with the present invention, a relationship between the number of revolutions and the feed speed can be set automatically depending on measuring precision. This enables selection of the most efficient measurement according to measuring precision, thereby preventing a decrease in the operating efficiency of a machining device.

BRIEF DESCRIPTION OF THE DRAWINGS

FIG. 2(a) is a front view of a state where a reference tool is fixed to a main spindle; and FIG. 2(b) is a side view of the state.

FIG. 3(a) is a front view of a state where a position of a side surface of a tool is detected by a reference tool; and FIG. 3(b) is a side view of the state.

FIG. 4(a) is a front view of a state where a position of a tip of a tool measured is detected; and FIG. 4(b) is a side view of a cutting edge.

FIG. 6(a) is a front view; and FIG. 6(b) is a side view of a cutting edge.

FIG. 7(a) is a front view; and FIG. 7(b) is a side view of a cutting edge.

FIGS. 8(a) to 8(g) illustrate relationships at 0°, 15°, 30°, 45°, 60°, 75°, and 90°, respectively.

FIG. 9(a) is a table of precision; and FIG. 9(b) is a display for poor precision.

FIG. 11(a) illustrates motions when a ball end mill machines a circular arc surface; and FIG. 11(b) is an enlarged view of a section of an object machined.

DESCRIPTION OF THE PREFERRED EMBODIMENTS

Figure 1:
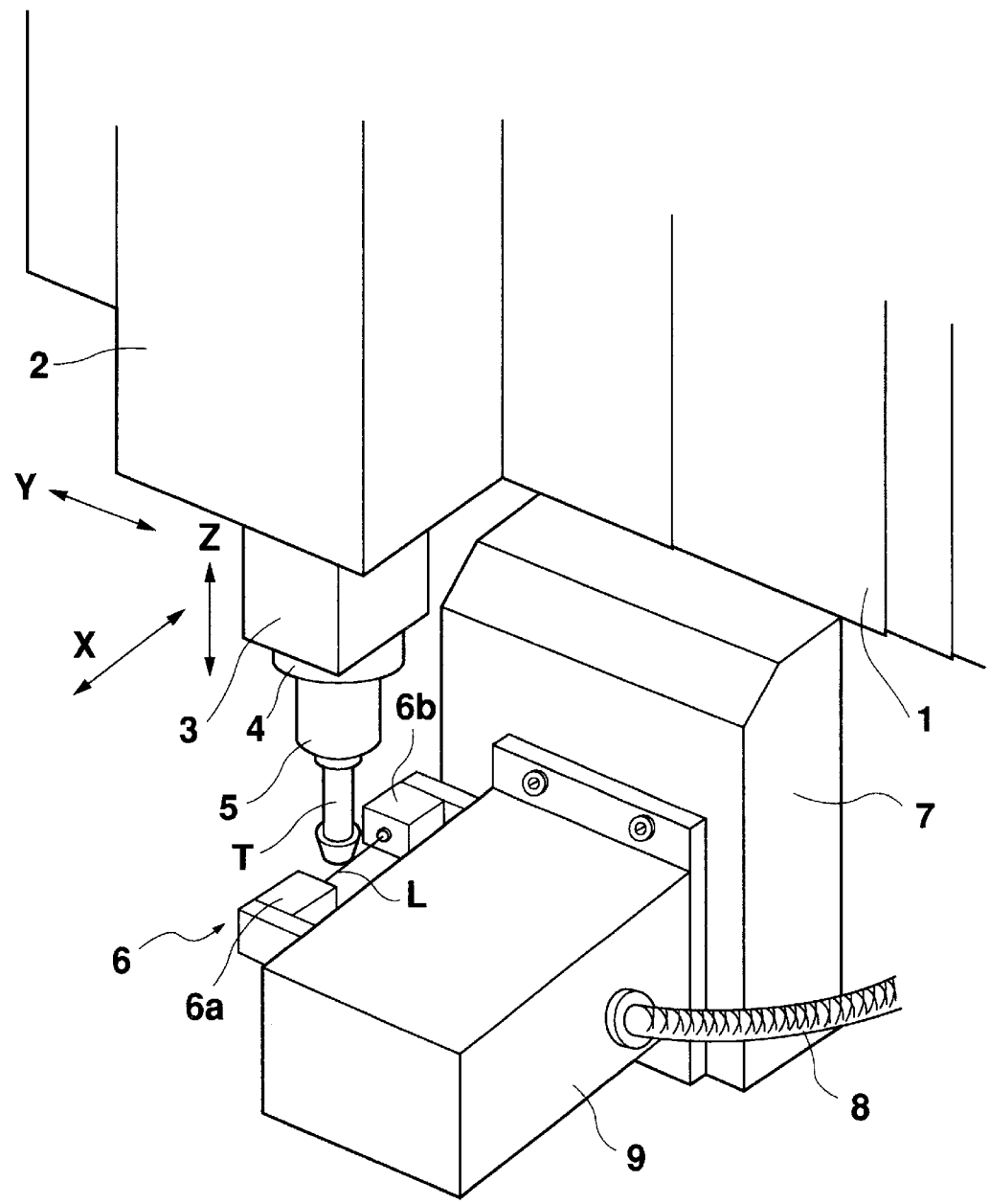
FIG. 1 perspective view of a laser measuring device and a main spindle head that are fixed to a cross rail of a machining center.
Figures 2A, 2B:
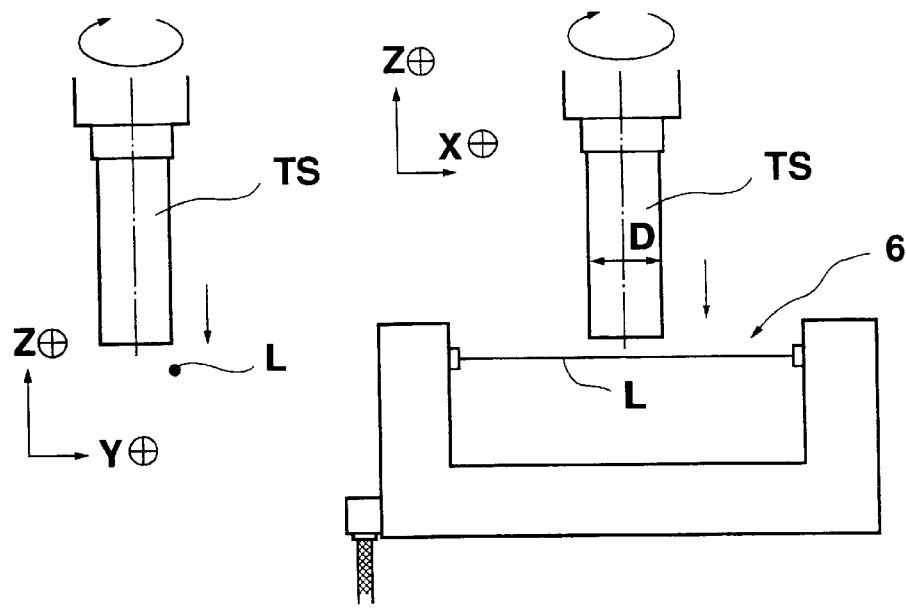
FIGS. 2(a) and 2(b) illustrate an operation of the present invention.
Figures 3A, 3B:
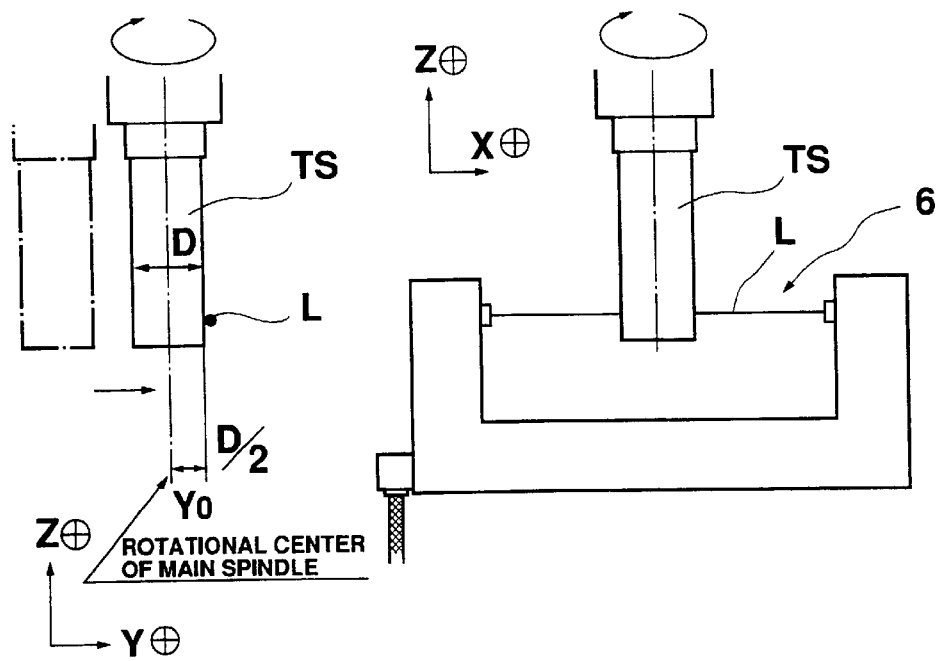
FIGS. 3(a) and 3(b) illustrate an operation of the present invention.

FIG. 1 is a perspective view showing a laser measuring device and a main spindle head that are fixed to a cross rail of a gate-shaped machining center as a machining device.

Referring to FIG. 1, a cross rail 1 is supported by a column standing beside a bed (not shown) in such a manner that the cross rail 1 can move and be positioned in the Z-axis direction. The front of the cross rail 1 is provided with a slideway in the Y-axis direction, and a main spindle head 2 is fixed so that it can move and be positioned along the Y-axis slideway. The main spindle head 2 is provided with a main spindle ram 3 so that it can move and be positioned in the Z-axis direction. The main spindle 4 is rotatably held to the main spindle ram 3 by a plurality of bearings. A ball end mill T, as a tool to be measured, is loaded by a milling chuck 5 and fixed to a tip taper hole of the main spindle 4 so that it can be fixed or removed.

A laser measuring device 6 is fixed to the cross rail 1 in the vicinity of the end of the Y-axis direction on the underside of the cross rail 1, through a mount 7 so that a laser optical axis is in the X-axis direction. The laser measuring device 6 monitors laser beam L from a laser emitting unit 6a reaching a diode disposed inside through a small window of a fluorescence unit 6b. When a tool passes through the laser beam L while crossing at a right angle, the laser measuring device 6 outputs sensor signals if the area of a shadow intercepted becomes 90% of the small window. A cable 8 is an electric wire that supplies power-supply voltage and transfers sensor signals to a NC device (not shown). A reference numeral 9 designates a protection cover.

The laser measuring device 6 may be a commercial unit such as, for example, Laser "MiNi" for machining center, manufactured by BLUM Inc. When the NC device (not shown) of the machining center receives sensor signals from the laser measuring device 6, a position at the time of receiving is read and slide is immediately stopped.

Figure 10:
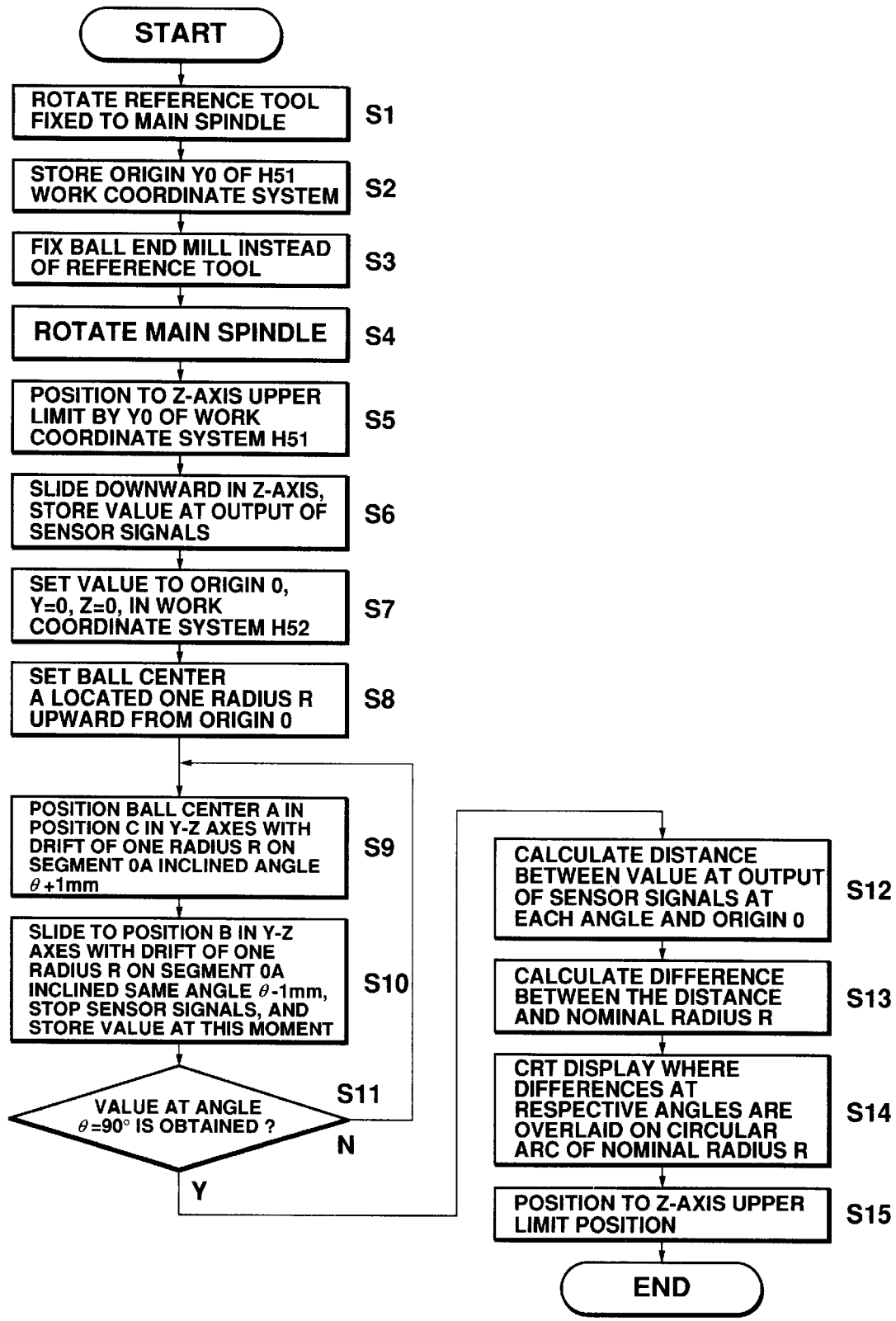
FIG. 10 is a flowchart illustrating an operation of the present invention.
Figure 11A:
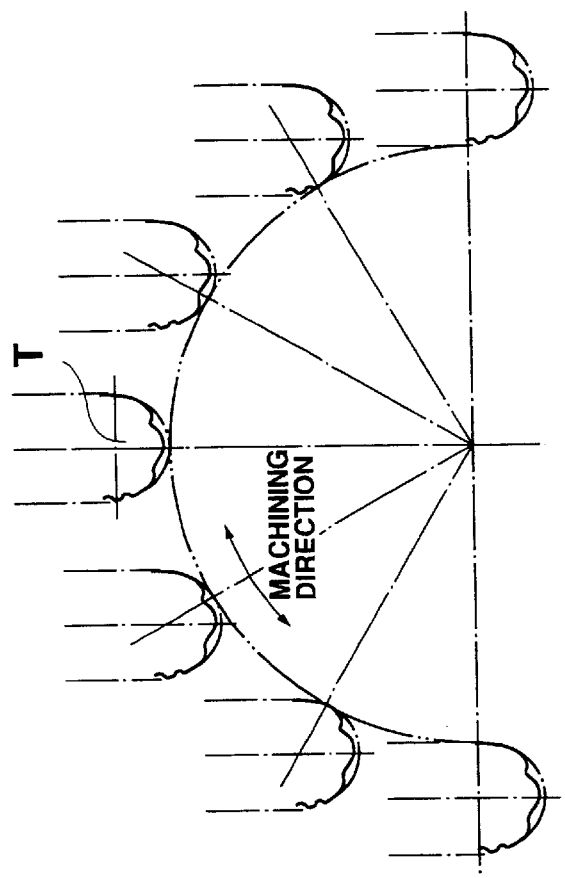
FIGS. 11(a) and 11(b) illustrate a relationship between sphericity of a ball end mill and machined surface of the prior art.
Figure 11B:
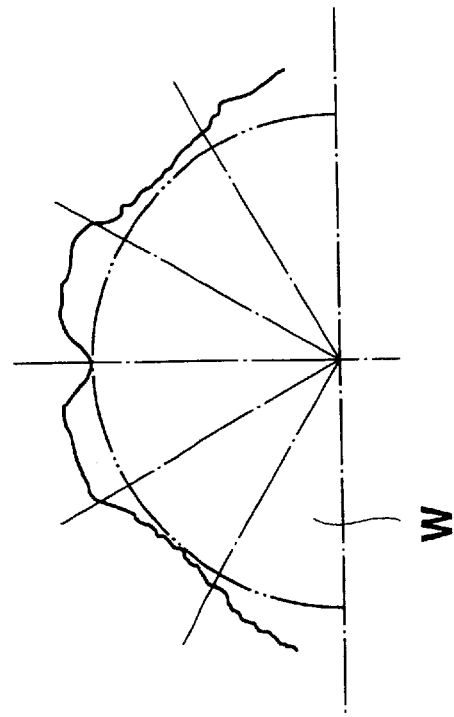
Figure 12:
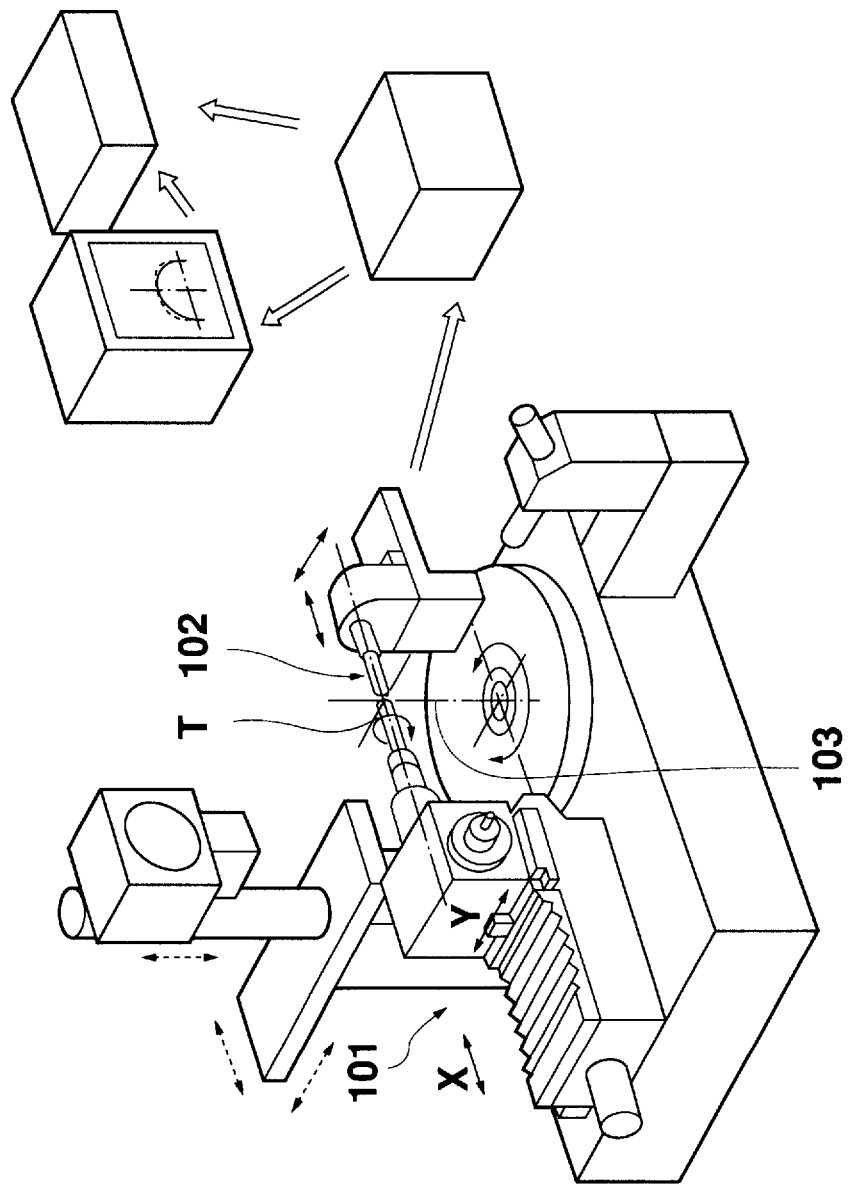
FIG. 12 is a perspective view of a prior art device for tool inspection.

Referring to FIGS. 2(a) to 9, a method of measuring the sphericity of a ball end mill T by utilizing the above measuring system, will be described according to the order of a flow chart shown in FIG. 10.

First, referring to FIGS. 2(a), 2(b), 3(a), and 3(b), in step S1, a cylindrical-shaped reference tool TS with known precise tool diameter D and superior concentricity, free from deflection, is fixed to a main spindle 4 of a machining center and then rotated. In step S2, the reference tool TS is positioned in the Y-axis direction so that its side face interrupts a laser beam L from a laser measuring device 6 to obtain a coordinate value at the time when the laser measuring device 6 outputs sensor signals. A position where one radius (D/2) of the reference tool TS is moved from the obtained value is set as a rotational center position of the main spindle 4. This is recorded as an origin $Y_0$ in a work coordinate system number 51.

Figures 4A, 4B:
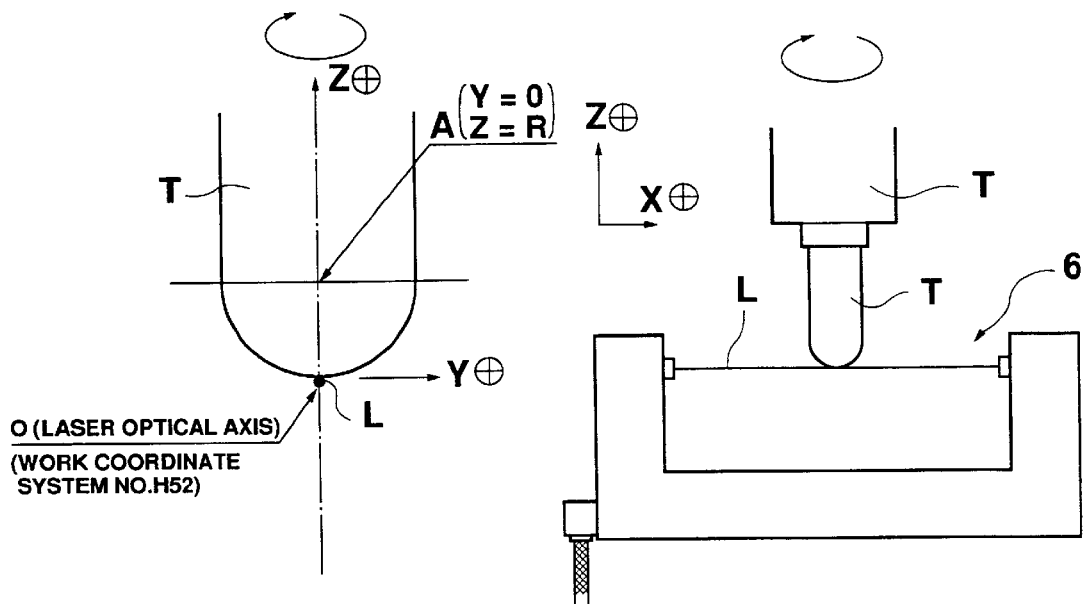
FIGS. 4(a) and 4(b) illustrate an operation of the present invention.

Referring to FIGS. 4(a) and 4(b), in step S3, the rotation of the main spindle 4 is stopped and, in place of the reference tool TS, a measured ball end mill T is fixed to the main spindle 4. In step S4, the main spindle 4 is rotated at Srpm. In step S5, by the origin $Y_0$ (the central position of the main spindle 4) in the work coordinate system number 51, the main spindle 4 is positioned in an upper limit position along the Z-axis (plus limiting position). In step S6, when moved downward in the Z-axis direction, the tip of the ball end mill T intercepts a laser beam L and sensor signals are output, thereby storing a coordinate value in Z-axis. In step S7, the stored value is set as an origin 0 (Y=0, Z=0) in a work coordinate system number H52.

Origin 0 is an origin on measurement when a laser optical axis is defined as Y=0 and Z=0. In step S8, there is obtained Position A (Y=0, Z=R) where a preset nominal tool radius R (the radius of a ball) is moved from the origin 0 to the plus side in the Z-axis direction to set a ball center A.

The method for setting the ball center is not limited to the above procedure. For instance, from the average value measured when a rotating ball end mill crosses a laser beam in the Y-axis, the center of the ball end mill can be obtained. When the ball end mill is moved to the minus side along the Z-axis direction on the line of the rotational center, the point at which the ball end mill intercepts a laser beam is set as a tip of the ball end mill. A point where one nominal radius is moved from the position of the tip to the plus direction in the Z-axis may be employed as the ball center.

Figure 5:
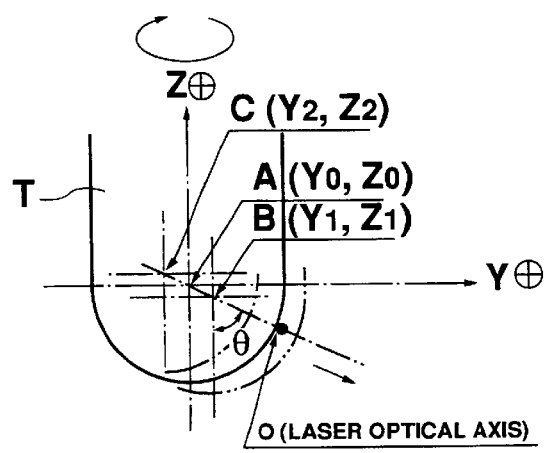
FIG. 5 illustrates an operation of the present invention, i.e., a state where a tip spherical face of a tool measured is measured each tilt angle.
Figures 6A, 6B:
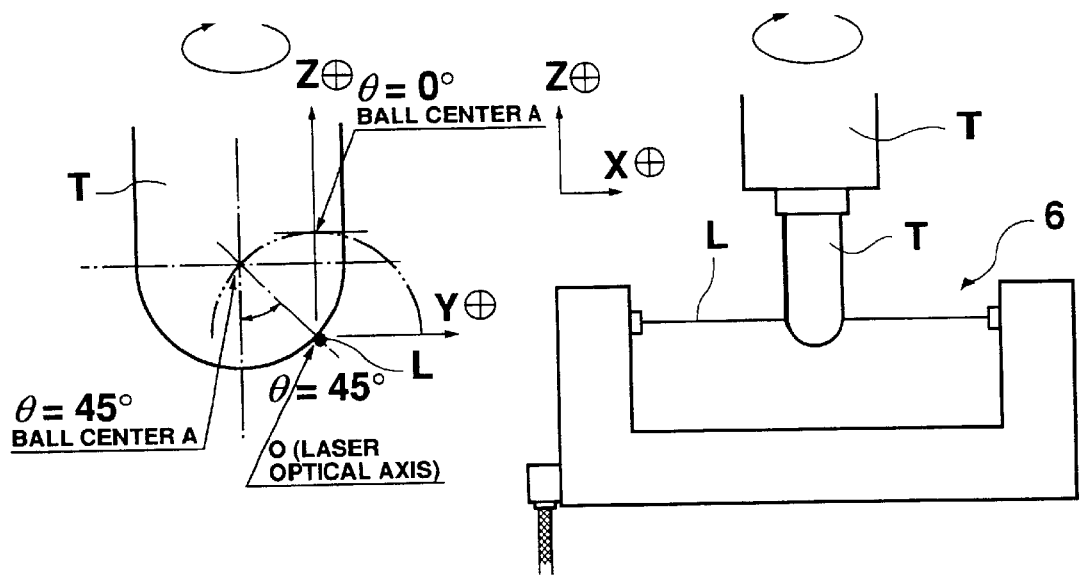
FIGS. 6(a) 6(b) illustrate an operation of the present invention, i.e., a state of measuring at a tilt angle of 45°.
Figures 7A, 7B:
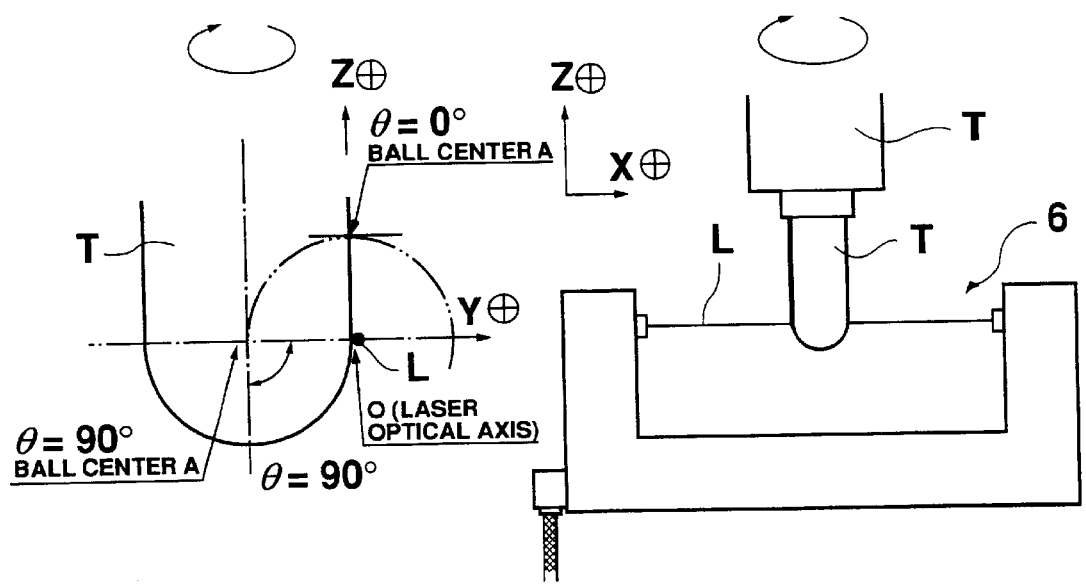
FIGS. 7(a) and 7(b) illustrates an operation of the present invention, i.e., a state of measuring at a tilt angle of 90°.
Figure 8A:
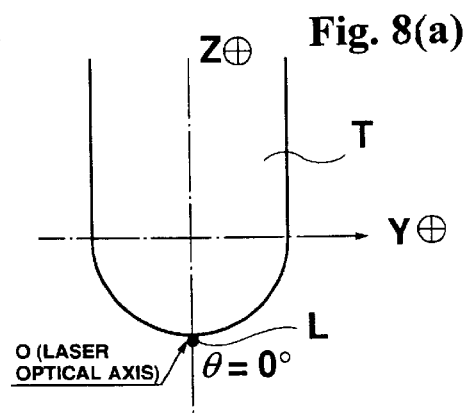
FIGS. 8(a) to 8(g) illustrate relationships between an origin 0 and a cutting edge for each tilt angle.
Figure 8B:
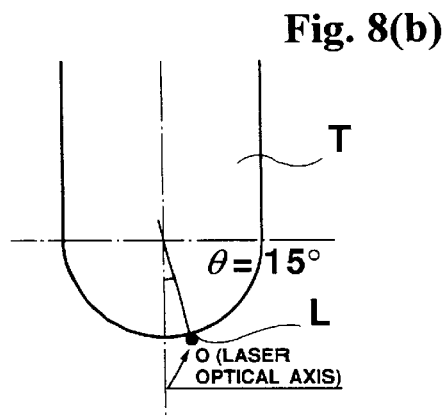
Figure 8C:
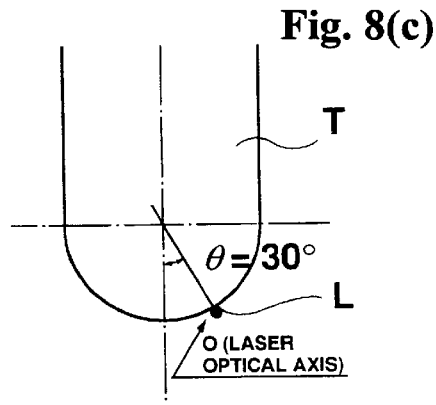
Figure 8D:
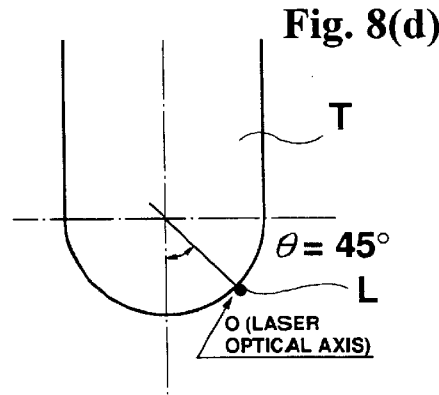
Figure 8E:
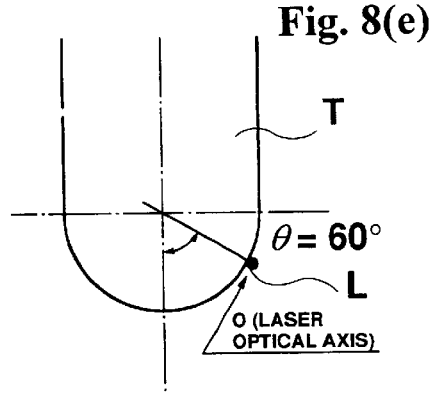
Figure 8F:
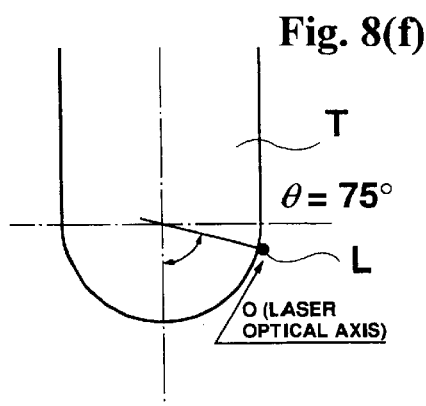
Figure 8G:
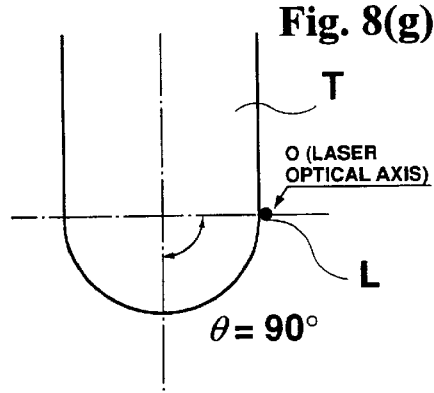
Figure 9A:
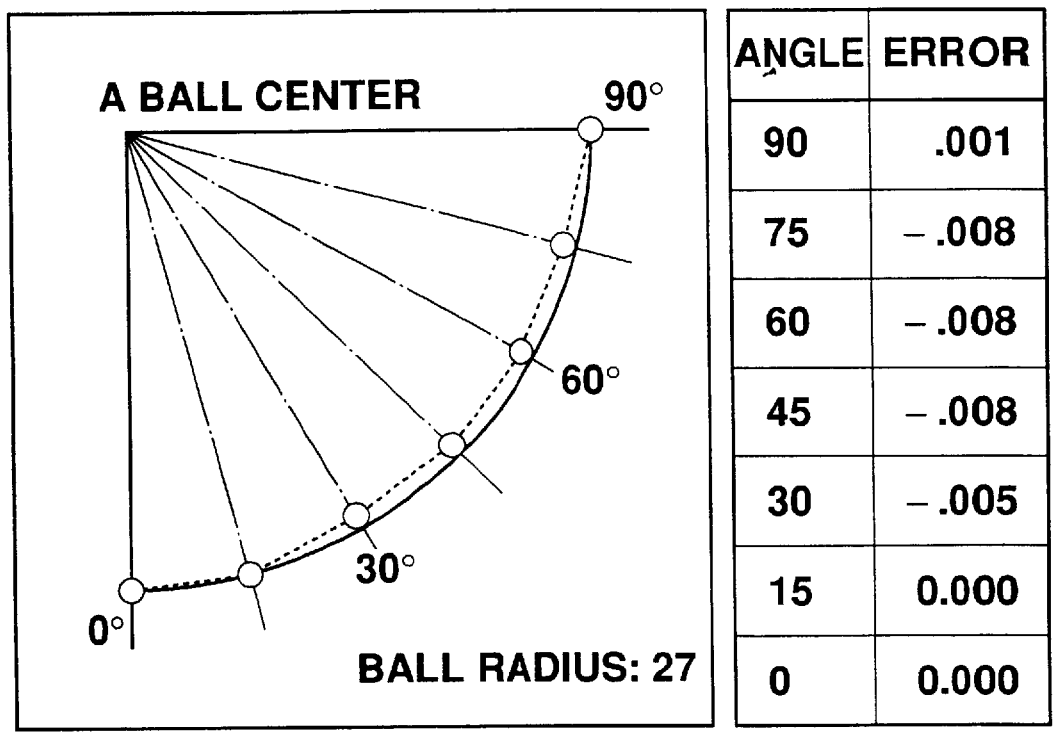
FIGS. 9(a) 9(b) illustrate a CRT display of a measured sphericity of a ball end mill.
Figure 9B:
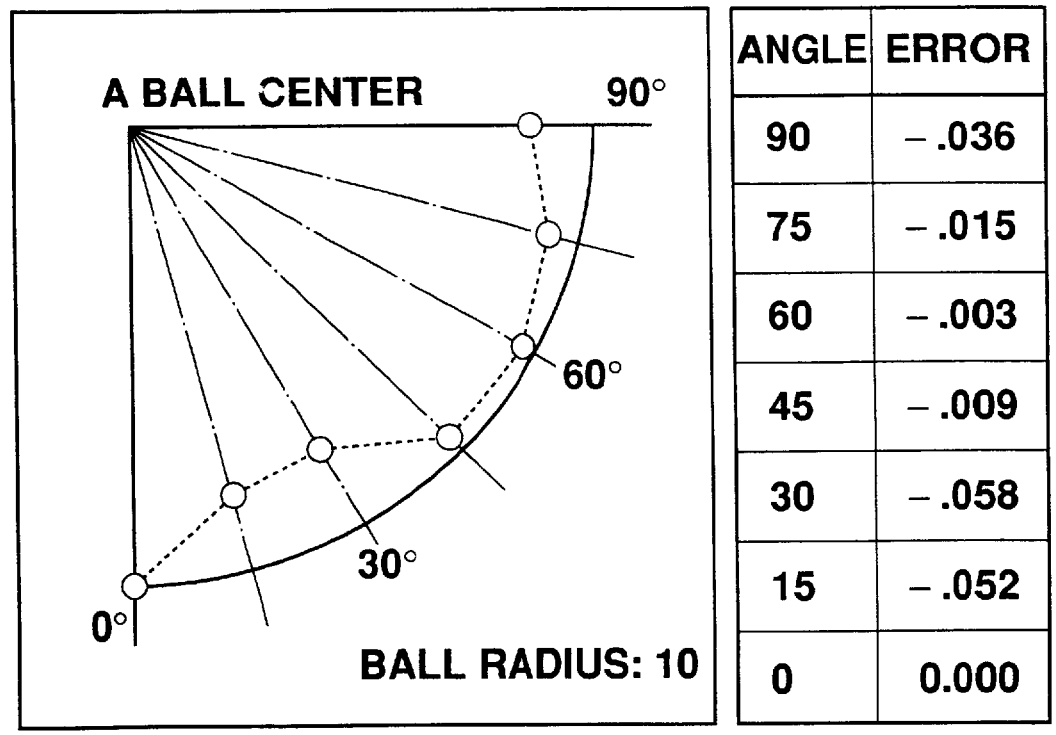

Referring to FIG. 5, in step S9, for an assumed measuring line determined per an arbitrary angle θ within 90°, e.g., θ=15°, around the origin 0 (Laser optical axis). Position C where a small amount, e.g., 1 mm in this embodiment, is added to one nominal radius R of the ball, is obtained from Equation 1 as a difference from the origin 0. The ball center A is positioned in Point C. As a result, the laser optical axis (the origin 0) is located in a position about 1 mm away from a cutting face of the ball end mill on an extension of the measuring line 0A tilted at an angle θ.

$Y2 = -(R+1)\sin θ$ $Z2 = -R+(R+1)\cos θ$ (Equation 1)

Referring to FIGS. 6(a), 6(b), 7(a), and 7(b), in step S10, Position B, where there is small movement, e.g., 1 mm in this embodiment, to the minus side on the measuring line 0A, is obtained from Equation 2 as a difference from the origin 0. The ball center A is moved to Position B by sliding along the X–Z axes at a feed speed, for example, F=S/1000 mm/min, where S is the number of revolution of the main spindle 4. When the cutting face of the ball end mill T, i.e., the tip of the rotating cutting edge, intercepts a laser beam and sensor signals are output, sliding is stopped and a coordinate value of the ball center A at that time is recorded.

$Y1 = -(R-1)\sin θ$ $Z1 = -R+(R-1)\cos θ$ (Equation 2)

When the feed speed F is set to 1/1000 the number of revolution S of the main spindle, as described above, when the number of revolution is 6000 rpm, the resulting feed speed would be 6 mm/min. This means that a cutting edge approaches a laser optical axis at 0.001 mm/min per one rotation. Thus, measuring precision including deflection in rotation is 0.001 mm, except for a mechanical precision. By designating a measuring precision, the feed speed to the number of tool revolutions can be set automatically. Measuring precision may be set in a range of from 0.1 mm to 0.00001 mm.

Although in the above measuring the cutting edge is moved so as to approach a laser optical axis, a cutting edge may also be moved so as to depart from a laser optical axis in order to obtain a position at which a laser optical axis departs from the cutting edge during the course of movement.

Although in the above description the ball end mill is moved on a measuring line through the ball center, a measuring line can be determined in parallel with the Y- or Z-axes.

Referring to FIGS. 8(a) to 8(g), in step S11, it is confirmed whether or not a tilt angle θ is 90°, that is, whether all seven measurements at 15° intervals have been carried out. For "NO", the process returns to step S9. For "YES", in step S12, measurement for a tilt angle θ is repeated up to 90°, to record each value of the ball center A. The difference between the origin 0 and each value of the ball center A is calculated. In step S13, a difference between each obtained difference and a nominal radius R is calculated. In step S14, on a CRT display, each difference thus obtained is overlaid with the corresponding nominal radius R that is calculated on a circular arc of a nominal radius R in the ball center A.

In step S15, the main spindle 4 (the ball end mill T) is positioned in an upper limit position (plus limiting position) in the Z-axis, thereby completing the measurement.

Although in this embodiment the laser measuring device 6 is placed so that a laser optical axis a faces the X-axis direction in order to perform measurement by sliding along the Y-Z axes, the laser measuring device 6 may also be placed so that the laser beam L faces to Y-axis direction in order to perform measurement by sliding along the X-Z axes.

Although in this embodiment the CRT display of the sphericity is obtained by calculating data with the NC device, this data may be transferred to other calculation controllers, e.g., personal computers, for performing required calculations, thereby making a CRT display under control of such a computer side.

In addition, a radial measuring value can be obtained by moving from an obtained tip position to a position in the Z-axis with a drift of one nominal radius of a ball end mill. Employing the radial measuring value as a nominal radius, a similar measurement can be performed.

Furthermore, the results obtained in the measuring method of the invention can be used as data on shape precision of cutting edges for use in error correction methods based on shape precision of a cutting edge of a tool. Such a method is disclosed by the present applicant in Japanese patent Application Laid-Open No. Hei. 2-311242 (1990).

As an alternative for setting a ball center, three points on a cutting face of a ball end mill may be measured and the center of a circular arc passing through the three points can be calculated by a Numerical Control apparatus or a personal computer to thereby obtain the ball center.

As previously described, measurement of sphericity of a ball end mill on a machining device enables automated measurement under machining conditions. That is, the deflections of tools, tool holders, main spindles, and the like are all included into that condition. This leads to a measurement that conform with the machined surface. It is thereby possible to select a ball end mill with excellent sphericity to perform shape machining with very precise finish machining or the like.

Although using tool point wearing data to decide replacement is known, the present invention provides measurements that take a state of radical cutting edge wearing into consideration, which permits precise timing of tool replacement.

A CRT display in which measured actual radius is overlaid with a nominal radius permits prompt confirmation of part sphericity. Based on a displayed shape, predictions of which part may cause shape deterioration of machined surface are possible. Such a displayed shape can also be used as reference data when regrinding tools.

Monitoring wear positions of tools allows the recognition of machined positions at which wear is significant. This information can be used as machining method reexamination data and can also be used as data for reinforcement of cutting edges at which wear is significant and for improvement of cutting parts, such as shapes or materials that cause significant wear.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A method of measuring ball end mill sphericity, comprising the steps of:

fixing a reference tool of known outer diameter to a main spindle of a machining device and, while rotating the main spindle, relatively moving a laser measuring device and the reference device to measure a position of a periphery of the reference tool when laser beams cross the periphery;

obtaining a rotational center of the reference tool from the position of the periphery;

fixing a ball end mill in place of the reference tool to the main spindle and, while rotating the main spindle, measuring a position of a tip of the ball end mill in the rotational center with the laser measuring device;

obtaining a ball center of the ball end mill from the position of the tip;

defining a plurality of measuring lines crossing a peripheral cutting face of the ball end mill by using the ball center;

relatively moving the ball end mill and the laser measuring device on the measuring lines while rotating the main spindle, to measure a position of the cutting face when laser beams cross the peripheral cutting face of the ball end mill;

obtaining an actual radius from the position of the cutting face to the ball center; and obtaining a sphericity of the cutting face from the difference between the actual radius and the nominal radius.

2. A measuring method according to claim 1, further comprising the steps of:

relatively moving the laser measuring device and the ball end mill to measure two points on both side surfaces via a rotational center of the ball end mill;

obtaining a position of the rotational center from a distance between the measured two points;

measuring a position of a tip of the ball end mill on the rotational center;

obtaining a ball center from the measured position of the tip;

measuring a plurality of arbitrary points on the cutting face by laser beams;

obtaining each actual radius on a normal from each point of the cutting face to the ball center; and obtaining a sphericity of the cutting face based on differences between the actual radiuses and the nominal radiuses.

3. A measuring method according to claim 1 wherein measurements of the arbitrary points on a cutting face are conducted by relatively moving the laser measuring device and the ball end mill along a nominal on the cutting face.

4. A measuring according to claim 1 wherein each actual radius on the normal of the ball end mill is overlaid with each nominal radius on a screen display.

5. A measuring method of a ball end mill according to claim 1 including a step of setting a relative displacement of the ball end mill and the laser measuring device per one rotation of the ball end mill, depending on a measuring precision.

6. A measuring method according to claim 1 wherein the laser measuring device outputs signals when the ball end mill intercepts a laser beam or a laser beam resumes passing.

* * * * *